3,340,322
CONVERSION OF OLEFINS
Louis F. Heckelsberg, Bartlesville, Okla., assignor to Phillips Petroleum Company, a corporation of Delaware
No Drawing. Filed Jan. 9, 1964, Ser. No. 336,624
8 Claims. (Cl. 260—683)

This invention relates to the disproportionation of olefin hydrocarbons. In one aspect the invention relates to the disproportionation of olefin hydrocarbons by contact with a catalyst comprising molybdenum sulfide or tungsten sulfide. In another aspect the invention relates to catalysts for olefin hydrocarbon disproportionation.

By disproportionation according to this invention is meant the conversion of a hydrocarbon into similar hydrocarbons of both higher and lower number of carbon atoms per molecule. In the case of olefins, a mixture of new products is obtained comprising olefins of both higher and lower molecular weight. Such an operation is useful in many instances. For example, a more plentiful hydrocarbon can be converted to a less plentiful and therefore more valuable hydrocarbon. One instance of such a conversion occurs when the process of this invention is used to convert both higher and lower molecular weight olefins in the $C_{10}$–$C_{16}$ range, a range of olefins especially suitable for the manufacture of detergents. In another instance, the olefin production of a naphtha cracking plant can be balanced by disproportionating the large quantities of propylene obtained into ethylene and butenes. The disproportionation of propylene to produce ethylene and butene is a particularly valuable disproportionation reaction and approximately equimolar quantities of ethylene and butenes can be produced.

An object of this invention is to convert an olefin feed to hydrocarbons of higher and lower molecular weight.

Another object of this invention is to produce ethylene and butenes from propylene.

Another object of this invention is to provide catalysts for olefin hydrocarbon disproportionation.

Other aspects, objects and the advantages of my invention are apparent in the written description and the claims.

According to my invention, the disproportionation of an olefin hydrocarbon is accomplished by contacting the hydrocarbon with a catalyst comprising molybdenum sulfide or tungsten sulfide, or a mixture of these sulfides, and a catalyst base containing alumina, silica, or silica alumina.

Olefins which are subject to disproportionation according to the process of this invention include acyclic olefins containing at least three carbon atoms per molecule, and their aryl derivatives and mixtures thereof. A useful group of feed materials are acyclic monoolefins containing from three to twenty carbon atoms per molecule, and mixtures thereof, a preferred group being those acyclic monoolefins containing from three to twelve carbon atoms per molecule. At the present time most commercial applications of the invention occur within the group of acyclic monoolefins containing from three to six carbon atoms per molecule. Some examples of compounds suitable for disproportionation according to this invention are acyclic 1- and 2-alkenes, and alkyl and aryl derivatives thereof having from 3 to 20 carbon atoms per molecule. Some specific examples of such olefins are propylene, 1-butene, 2-butene, 1-pentene, 2-pentene, 1-hexene, 2-heptene, 1-octene, 2-nonene, 1-dodecene, 2-hexadecene, 2-methyl-1-butene, 2-methyl-2-butene, 3-methyl-1-butene, 1-phenylbutene-2, and 3-heptene. Higher disproportionation conversion and wider product distribution are obtained at comparable reaction conditions with 1-olefins than with 2-olefins. Three-olefins are disproportionated at lower rates.

The catalyst of this invention comprises alumina, silica, or silica-alumina promoted by a sulfide of molybdenum, a sulfide of tungsten, or a mixture of these sulfides. Any conventional catalytic grade of alumina, including the eta or gamma forms can be used. An alumina according to this invention can contain other materials which do not substantially promote undesirable side reactions, for example, magnesia, titania, or other bases in amounts which do not change the essential characteristics of the reaction. Small amounts of silica or magnesia can be used to make the base more resistant to surface area reduction by contact with moisture.

The silica component of the catalyst can be any conventional catalyst grade silica. Some examples are precipitated silica gel, microspheroidal silica, flame hydrolyzed silica, and silica aerogels. These materials have appreciable surface area, usually in the range of 50 to 700 $M^2/g.$, and can range from fine powders to coarse granules. These materials often contain small amounts of compounds of aluminum and of sodium, in the order of a few tenths percent by weight, and smaller. Trace amounts of other metals, and such small amounts of these materials are acceptable.

Silica-alumina bases are known to have catalytic activity for various hydrocarbon reactions, such as cracking and polymerization. These reactions can be substantially avoided by proper selection of the base, reaction temperatures and contact time. By careful selection of conditions, conversion predominately to disproportionated products can be obtained with varying amounts of silica and alumina in the base, varying from 100 percent alumina to 100 percent silica. Generally, lower temperatures are used with higher alumina content.

The amount of molybdenum sulfide or tungsten sulfide is in the range of 0.5 to 30 percent by weight of the total catalyst composition, preferably 2 to 10 weight percent.

The composite catalyst is prepared by conventional methods such as dry mixing, coprecipitation, or impregnation. A convenient method is to dry blend the sulfide and the support in a ball mill where intimate contact between the finely divided particles, is achieved. The milled composite can then be employed in the inventive process in the finely divided state or can be pressed into pellets or tablets of various sizes and shapes. If desired, pelleted catalysts can be crushed to obtain particles having specific mesh size.

By an alternate technique for preparing the catalyst, a compound of molybdenum or tungsten, which is not a sulfide, can be incorporated into the base. Following this, the composite is treated with a sulfur-containing reagent to convert the metal compound into a metal sulfide. For example, a composite containing molybdenum oxide and alumina can be treated with a gas such as hydrogen sulfide at elevated temperatures.

Before use in the disproportionation reaction, the above described composite catalysts are activated by a heat treatment. The catalysts are subjected to a temperature in the range of 800 to 1400° F. for periods of 0.5 to 20 hours or longer. Generally the longer activation periods are used with lower temperatures and shorter activation periods with higher temperatures. The heating can be carried out in the presence of a gas, for example nitrogen, hydrogen, carbon monoxide, the noble gases, or mixtures thereof. Significant amounts of moisture in the activation gas, especially at higher temperatures, are harmful to the catalyst by reducing the surface area. In some instances the catalyst is serially heated in more than one gas.

In the practice of this invention, the catalyst can be used, without regeneration, for runs of up to several hours or more, and can be regenerated repeatedly without serious damage. The regeneration can be accomplished by conventional methods for regenerating sulfide catalyst.

The process of the invention can be carried out either batchwise or continuously, using a fixed catalyst bed, or a stirred batch reactor, a fluidized catalyst chamber, or other contacting technique. Preferred reaction conditions, for example temperature, pressure, flow rates, etc., vary somewhat depending on the specific catalyst composition, the particular feed olefin, desired products, etc. The process generally is carried out in vapor or liquid phase at temperatures from about 150 to about 1000° F., at pressures of 0 to 1500 p.s.i.g. Although the disproportionation reaction of this invention is essentially independent of pressure, for most economical operation, considering combination with other steps of a complete plant operation including, for example, product separation and recovery, a pressure range of 200 to 600 p.s.i.g. can be used conveniently.

When using high alumina content bases, the temperature generally is in the range of 150 to 600° F., preferably 250 to 400° F. With high silica content bases, the temperature generally is in the range of 400 to 1100° F. With high silica content bases excellent results are obtained with tungsten sulfide catalysts in the range of 600 to 900° F., and with molybdenum sulfide catalysts in the range of 800 to 1000° F. With intermediate silica-alumina bases, intermediate temperatures are used. As noted above, temperature and contact time are selected to minimize undesired side reactions.

The operable range of contact time for the process of this invention depends primarily upon the operating temperature and the activity of the catalyst, which is influenced by surface area, promoter concentration, activation temperature, etc. In general, the distribution of products is not drastically altered by variation in contact time. However, long contact times favor the production of larger proportions of higher molecular weight products. In general, shorter contact times are associated with higher temperatures, but, when larger amounts of higher molecular weight products are desired, a suitable combination of contact time and temperature can be selected.

selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the disproportionation reaction.

At the end of the reaction period, the hydrocarbon phase is separated from the solid catalyst by known methods, and subjected to product recovery. Such techniques as fractional distillation, solvent extraction, adsorption, and the like can be employed for separaiton of products. Unconverted feed materials or products not in the desired range can be recycled. The invention is further illustrated by the followign examples.

EXAMPLE I 37.4 parts by weight of a commercial catalyst which contained 20 weight percent $MoS_3$ and 80 weight percent $Al_2O_3$ was extended with 38.0 parts by weight of additional catalytic grade $Al_2O_3$ by ball milling for 5 hours. The homogeneous powder was then pelleted by compression in a pellet die. The resulting pellets were then crushed and the 20-40 mesh fraction was charged into a glass reactor tube. A quantity of sand was placed in a layer ahead of the catalyst bed. While in the reactor, the catalyst bed was activated by heating at 1000° F. for 4 hours in the presence of flowing nitrogen.

After the catalyst activation a flow rated and dried stream of propylene was admitted into the reaction tube at a space rate of 600 vol. feed/vol. cat./hr. and at atmospheric pressure. The effluent from the reactor was analyzed chromatographically.

The temperature of this continuous disproportionation reaction was varied and the effluent was analyzed for products at several different reaction temperatures. The results are shown in the table below.

DISPROPORTIONATION OF PROPYLENE—EFFLUENT ANALYSIS
Catalyst: 10 $MoS_3$, 90 $Al_2O_3$; Space Rate: 600 v./v./hr.; Pressure: Atmospheric; Temperature: Variable.

|  | Reaction temperature, °F. | | | | | |
| --- | --- | --- | --- | --- | --- | --- |
|  | 200 | 250 | 300 | 350 | 400 | 450 |
| Ethylene, weight percent | 0.4 | 0.4 | 0.4 | 0.4 | 0.4 | 0.3 |
| Propylene, weight percent | 98.8 | 98.7 | 98.7 | 98.7 | 99.1 | 99.4 |
| 1-butene, weight percent | Trace | 0.1 | 0.1 | 0.1 | 0.2 | 0.3 |
| Trans-2-butene, weight percent | 0.5 | 0.5 | 0.5 | 0.5 | 0.2 | Trace |
| Cis-2-butene, weight percent | 0.3 | 0.3 | 0.3 | 0.3 | 0.1 | Trace |

With proper selection of conditions and contact times, very high efficiency of conversion to desired products can be obtained. Conversion of propylene can be obtained with efficiency of conversion to ethylene and butenes in the range of about 90 percent and higher.

In batch reactions, the catalyst comprises from 1 to 40 weight percent of the reaction mixture, and reaction times of about 1 minute to 10 hours are used. In continuous vapor phase operations, gaseous space velocities in the range of 6 to 1500 v./v./hr. are used.

The disproportionation reaction can be carried out either in the presence or absence of a diluent. Diluents The presence of ethylene as well as butenes in the reactor effluent indicate that the molybdenum sulfide catalyst is active for disproportionation.

EXAMPLE II

A tungsten sulfide catalyst was prepared by ball milling for 4 hours 11.2 parts by weight $WS_2$ and 117.1 parts by weight of $Al_2O_3$. The resulting powder was pelleted and broken up into 20–40 mesh particels and activated in the manner described above, then similarly tested for disproportionation activity. The results are seen in the table below.

DISPROPORTIONATION OF PROPYLENE—PRODUCTS ANALYSIS
Catalyst: 4 $WS_2$, 96 $Al_2O_3$; Space Rate: Variable; Pressure: Atmospheric; Temperature: Variable.

|  | Reaction temperature, °F. | | | | | |
| --- | --- | --- | --- | --- | --- | --- |
|  | 200 | 250 | 300 | 350 | 400 | 450 |
| Space rate, v./v./hr | 600 | 60–120 | 60–120 | 600 | 600 | 600 |
| Ethylene, weight percent | Trace | 0.1 | 0.3 | 0.2 | 0.2 | 0.2 |
| Propylene, weight percent | 100 | 99.8 | 99.0 | 99.5 | 99.4 | 99.3 |
| 1-butene, weight percent | Trace | Trace | 0.2 | 0.1 | 0.1 | 0.2 |
| Trans-2-butene, weight percent | Trace | 0.1 | 0.3 | 0.1 | 0.2 | 0.2 |
| Cis-2-butene, weight percent | Trace | 0.05 | 0.2 | 0.1 | 0.1 | 0.1 |

The presence of ethylene and butenes in the reactor effluent indicate that the catalyst is active for disproportionation.

EXAMPLE III 10.8 parts of tungsten sulfide ($WS_2$) was ball milled with 206 parts of Houdry macroporous silica. The silica, which was originally in the form of 4 mm. beads had a surface area of about 374 m.$^2$/g., a pore diameter of about 25 Angstroms, and a bulk density of 0.44/kg./l. The ball milling was carried out for six hours in an atmosphere of air after which the homogeneous powder was pelleted by compression in a pellet dye. The resulting product was then crushed and a part of the 10–20 mesh fraction was charged into a glass reactor tube fitted with external electrical heating means. A quantity of glass beads was placed in a layer ahead of the catalyst bed as a preheat zone. While in the reactor, the catalyst bed was activated by heating at 1000° F. for four hours in the presence of flowing nitrogen. The catalyst contained about 5 weight percent tungsten sulfide.

At a temperature of 1000° F., at atmospheric pressure, and at a gaseous space rate of 10 v./v./min. a dried stream of propylene was admitted into the reaction tube. The effluent from the reactor was analyzed chromatographically. The reaction was continued for about 2½ hours. The results of several analyses taken during this period are shown in the table below. The table also shows a blank run. This was an analysis taken during a propylene control run which was carried out at identical conditions to those described above except that the catalyst bed contained Houdry macroporous silica which was not associated with tungsten sulfide.

|  | Time | | | |
| --- | --- | --- | --- | --- |
|  | 1,230 | 1,400 | 1,500 | Control |
| Ethylene | 5.5 | 6.5 | 6.7 | 1.3 |
| Propylene | 86.1 | 82.8 | 81.7 | 98.1 |
| 1-butene | 2.5 | 3.0 | 3.2 | 0.3 |
| Trans-2-butene | 3.4 | 4.3 | 4.7 | 0.2 |
| Cis-2-butene | 2.5 | 3.4 | 3.7 | 0.1 |

As is seen from the above table, the conversion in the tungsten sulfide catalyzed reaction varied during the reaction period from about 14 to about 18 percent. The presence of substantial amounts of ethylene as well as of butenes in the reaction effluent indicated that propylene was disproportionated.

EXAMPLE IV

A quantity of molybdenum sulfide was ball milled with macroporous silica to give a mixture having 5 weight percent of molybdenum sulfide. The silica was similar to that of Example III as was the catalyst preparation, reactor charging and activation.

At a temperature of 1000° F., at atmospheric pressure, and at a gaseous space velocity of 10 v./v./min. a dried stream of propylene was admitted into the reaction tube. The reaction was continued for 1½ hours. A chromatographic analysis was made on the effluent with the following results:

| | Weight percent |
| --- | --- |
| Ethylene | 3.4 |
| Propylene | 90.9 |
| 1-butene | 1.7 |
| t-2-butene | 2.2 |
| c-2-butene | 1.8 |

This is a disproportionation conversion of 9.1 percent.

Reasonable variation and modification are possible within the scope of my invention, which sets forth a process for the disproportionation of olefins by contact with catalyst comprising alumina, silica-alumina, or silica, promoted with molybdenum sulfide, tungsten sulfide, or mixtures of these sulfides.

I claim:

1. A process for the disproportionation of an olefin hydrocarbon which comprises contacting said hydrocarbon with a catalyst activated in an atmosphere and under conditions to permit activation for disproportionation, said catalyst comprising a base selected from the group consisting of alumina, silica-alumina, and silica and at least one sulfide selected from the group consisting of molybdenum sulfide and tungsten sulfide under conditions, including conditions of temperature, pressure and contact time suitable for obtaining a disproportionated product.

2. The process of claim 1 wherein said olefin hydrocarbon is an acyclic monoolefin having 3 to 20 carbon atoms per molecule, and said conditions are selected within a temperature range of 150 to 1100° F.

3. The process of claim 2 wherein said base is a high alumina base and said temperature is in the range of 150 to 600° F.

4. The process of claim 2 wherein said catalyst consists essentially of a high alumina base and between .5 and 30 weight percent of said sulfide and said temperature is in the range of 150 to 500° F.

5. The process of claim 2 wherein said catalyst consists essentially of a high silica base and between .5 and 30 percent of said sulfide and said temperature is in the range of 400 to 1100° F.

6. The method of claim 2 wherein said base is a high silica base and said temperature is in the range of 400 to 1100° F.

7. The method of claim 6 wherein said sulfide is molybdenum sulfide and said temperature is in the range of 800 to 1000° F.

8. The method of claim 6 wherein said sulfide is tungsten sulfide and said temperature is in the range of 600 to 900° F.

References Cited

UNITED STATES PATENTS

| 2,859,175 | 11/1958 | Smith | 208—136 |
| 2,968,612 | 1/1961 | Loughran et al. | 208—136 |
| 3,261,879 | 7/1966 | Banks | 260—683 |

DELBERT E. GANTZ, *Primary Examiner.*

C. E. SPRESSER, *Examiner.*